United States Patent [19]

Huybrechts

[11] Patent Number: 4,490,499

[45] Date of Patent: Dec. 25, 1984

[54] ALUMINUM FLAKE-RESIN DISPERSIONS

[75] Inventor: Jozef T. Huybrechts, Oud Turnhout, Belgium

[73] Assignee: E. I. Du Pont de Nemours and Company, Wilmington, Del.

[21] Appl. No.: 555,464

[22] PCT Filed: Feb. 17, 1983

[86] PCT No.: PCT/US83/00209

§ 371 Date: Nov. 28, 1983

§ 102(e) Date: Nov. 28, 1983

[87] PCT Pub. No.: WO83/03420

PCT Pub. Date: Oct. 13, 1983

Related U.S. Application Data

[63] Continuation-in-part of Ser. No. 364,926, Apr. 2, 1982, abandoned, which is a continuation-in-part of Ser. No. 254,458, Apr. 15, 1981, abandoned.

[51] Int. Cl.³ ............................................... C08F 5/05
[52] U.S. Cl. .................................... 524/376; 524/379; 524/441; 524/502; 524/546; 524/609
[58] Field of Search ............... 524/379, 376, 441, 502, 524/546, 609

[56] References Cited

U.S. PATENT DOCUMENTS

| | | |
|---|---|---|
| T988,008 | 11/1979 | Mayer et al. |
| 2,937,156 | 5/1960 | Berry |
| 3,389,105 | 6/1968 | Bolger |
| 3,856,736 | 12/1974 | Tieszen et al. |
| 3,857,852 | 12/1974 | Tieszen |
| 3,988,160 | 10/1976 | Trexel |
| 4,026,863 | 5/1977 | Iseki et al. |
| 4,139,576 | 2/1979 | Yoshimura et al. |
| 4,213,886 | 7/1980 | Turner |
| 4,236,934 | 12/1980 | Bell |
| 4,287,112 | 9/1981 | Berghmans |

Primary Examiner—Lorenzo B. Hayes

[57] ABSTRACT

Aluminum flake can be dispersed advantageously in a mixture of ethylene glycol and ethylene glycol monobutyl ether for use in solvent-based dispersions of poly(arylene sulfide) and optionally fluorocarbon.

6 Claims, No Drawings

ALUMINUM FLAKE-RESIN DISPERSIONS

CROSS REFERENCE TO RELATED APPLICATION

This is a continuation-in-part of U.S. patent application Ser. No. 364,926 filed April 2, 1982, now abandoned, which is a continuation-in-part of U.S. patent application Ser. No 254,458, filed April 15, 1981, now abandoned, which claims priority from international application PCT/US80/01759 filed Dec. 31, 1980, designating the United Kingdom (EPO) among other countries.

BACKGROUND

Dispersions of aluminum flake have been made in mixtures of kerosene and ethylene glycol monobutyl ether and other petroleum distillates such as "Solvesso 150" from Exxon Chemicals Co. for use with solvent-based dispersions of poly(arylene sulfide) such as poly(phenylene sulfide) (PPS) and known fluorocarbon polymers such as polytetrafluoroethylene (PTFE) and copolymers of tetrafluoroethylene and hexafluoropropylene (FEP). Such solvent-based dispersions are quite suitable for spray application, but they can exhibit less than desirable settling and flow characteristics for application by coil coating techniques.

SUMMARY OF THE INVENTION

The present invention provides a dispersion of aluminum flake in a mixture of ethylene glycol and ethylene glycol monobutyl ether.

Preferably, each of the ethylene glycol and ethylene glycol monobutyl ether are present in amounts of about 40 –60% by weight of the two combined; more preferably at levels of about 55% ethylene glycol, 45% ethylene glycol monobutyl ether.

The invention also provides for using such dispersions of aluminum flakes in solvent-based dispersions of poly(phenylene sulfide) and optionally particulate fluorocarbon resin, preferably PTFE or FEP.

DETAILED DESCRIPTION

By changing the solvent mix and substituting ethylene glycol for kerosene in the prior art, the stability and flow characteristics of coating compositions of the invention are improved to an extent desirable for coil coating. The advantages of the invention are especially noticeable in the wetting of the aluminum flake and the production of stable dispersions in polyphenylene sulfide Ethylene glycol alone does not suitably wet aluminum flake. Ethylene glycol monobutyl ether alone as the solvent will not provide suitable long-term dispersion stability. Blended together according to the invention, the proper combination of the two gives good wetting and longer dispersion stability.

The invention will now be illustrated by examples. Parts, percentages and proportions herein are by weight except where indicated otherwise.

EXAMPLE 1

Solvent-Based 66.6 PPS/16 FEP/ 12.75 $TiO_2$/3.65 Al Flake

Prepare a premix by grinding in a pebble mill for 48 hours or grinding in a Dyno-mill for 5 passes a blend of

| | |
|---|---|
| "Ryton" V-I PPS resin from Phillips Petroleum Co. | 22.16 |
| FEP powder from Du Pont | 5.65 |
| "Tipure R 900" $TiO_2$ pigment from Du Pont | 4.24 |
| "Triton X-100" from Rohm & Haas (isooctylphenoxy-polyethoxyethanol) | 6.14 |
| Channel Black (carbon colorant) | 2.00 |
| Cobalt blue pigment | 0.05 |
| Ethylene glycol | 32.62 |
| Ethylene glycol monobutyl ether (butyl Cellosolve from Union Carbide) | 26.69 |
| | 100.00 |

This premix is then mixed in the following proportions:

| | |
|---|---|
| Premix | 96.44 |
| Aluminum flake | 1.78 |
| Blend of 55 parts ethylene glycol and 45 parts ethylene glycol monobutyl ether | 1.78 |
| | 100.00 |

The coating composition has satisfactory dispersion stability and has desirable viscosity and flow characteristics for application to coiled substrate of any suitable material such as aluminum by suitable techniques such as doctor blade or rolling coating. The coating can be cured by heating 10 minutes at 400° C. This drives off the liquid carrier and causes desirable coalescence of the coating. Alternatively, the coating can be cured at 370° C for 15 minutes, at 425° C. for 5-7 minutes or under equivalent conditions.

EXAMPLE 2

Comparison of Dispersion Stability

Aluminum flake was dispersed with a mixer in various solvent blends, and a settling rating was determined by putting bottles of the dispersions on a vibrating table for 24 hours and then testing the dispersion with a spatula. Equal weights of aluminum flake and solvent were used. The solvent modifications were:
A. 100 Ethylene glycol
B. 75A/25E
C. 50A/50E
D. 25A/75E
E. 100 Butyl Cellosolve The ratings were as follows:
A. Impossible to disperse—coagulated
B. Impossible to disperse—coagulated
C. Dispersed rating 7
D. Dispersed rating 6
E. Dispersed rating 5
The rating system, on a scale of 1-10, includes:
7 = Considerable soft deposit on bottom which, when lifted up, runs off the spatula freely. Deposit may be in appreciable volume.
6 = Considerable soft cake on bottom which does not flow off spatula. Cake may fall off spatula due to its mass.
5 = Considerable resistance to movement of the face of the spatula but only slight resistance to movement of the edge of the spatula.
In a blend of PPS, PTFE, mica flake, baryte, surfactant and solvent, the same variations in solvent blend gave the following ratings:
A. Dispersed rating 7

B. Dispersed rating 6
C. Dispersed rating 6
D. Dispersed rating 5
E. Dispersed rating 5

This shows that about equal parts of the two solvents are best for dispersion stability and the ability to disperse aluminum flake.

I claim:

1. In a solvent-based dispersion comprising poly(phenylene sulfide) and aluminum flakes, the improvement comprising dispersing the aluminum flakes in a mixture of ethylene glycol and ethylene glycol monobutyl ether wherein each of the ethylene glycol and ethylene glycol monobutyl ether are present in amounts of about 40–60% by weight of the two combined.

2. The solvent-based dispersion of claim 1 wherein the proportions are, by weight, about 50% ethylene glycol and 50% ethylene glycol monobutyl ether.

3. The solvent-based dispersion of claim 1 wherein the proportions are, by weight, about 55% ethylene glycol and 45% ethylene glycol monobutyl ether.

4. The solvent-based dispersion of claim 1 also containing fluorocarbon resin in particulate form.

5. The solvent-based dispersion of claim 4 wherein the fluorocarbon resin is polytetrafluoroethylene.

6. The solvent-based dispersion of claim 4 wherein the fluorocarbon resin is a copolymer of tetrafluoroethylene and hexafluoropropylene.

* * * * *